United States Patent Office 3,166,509
Patented Jan. 19, 1965

3,166,509
ANTIOXIDANT COMPOSITION
George G. Ecke, Detroit, Mich., and Alfred J. Kolka, O'Hara Township, Allegheny County, Pa., assignors to Ethyl Corporation, New York, N.Y., a corporation of Virginia
No Drawing. Filed Jan. 9, 1963, Ser. No. 250,237
8 Claims. (Cl. 252—57)

This application is a continuation-in-part of application Serial No. 241,521, filed December 3, 1962, now abandoned; and is a continuation-in-part of application Serial No. 68,353, filed November 10, 1960, now abandoned, which in turn is a continuation-in-part of application Serial No. 671,403, filed July 12, 1957, now abandoned, which in turn is a continuation-in-part of application Serial No. 426,556, filed April 29, 1954, now U.S. Patent 2,831,898.

This invention relates to alkylated phenol antioxidants and their use.

In U.S. Patent No. 2,831,898 we describe and claim an aromatic substitution process which involves reacting an organic compound possessing carbon-to-carbon unsaturation with a phenol having a hydrogen on a carbon atom ortho the hydroxy group, in the presence of a phenoxide catalyst. One decided advantage obtained by utilizing this process is that substituents can be selectively introduced onto the aromatic ring in the position ortho to the hydroxy group. By a careful selection of the reaction conditions, predominantly ortho substitution can be obtained. Thus, our process gives a direct route for the synthesis of many desirable chemicals, many of which are not obtainable by means known heretofore.

In utilizing the above novel process, we have been able to obtain new compositions of matter. Thus, in Examples VI and VII of the above patent we describe the alkylation of phenol with isobutylene using aluminum phenoxide as catalyst and show that this alkylation leads to reaction mixtures which, prior to fractionation, contain inter alia, 2,6-di-tert-butylphenol; 2,4,6-tri-tert-butylphenol and 2-tert-butylphenol (i.e., o-tert-butylphenol). It has now been found that by carrying out the aforesaid alkylation of phenol with isobutylene (aluminum phenoxide catalyst) under the conditions described in the above patent and then distilling certain low boiling components from the reaction mixture, there results an outstanding effective antioxidant mixture which has a combination of properties not possessed by any prior antioxidant. Among the beneficial attributes of the combinations of this invention are their tremendous antioxidant potency, superior stabilization of organolead antiknocks, susceptibility to being blended with commercial antiknock fluids, compatibility with phosphorus additives, water and caustic insolubility, lack of toxicity, stability in storage and handling, lack of deleterious color formation, very high fuel solubility, superior engine inductibility, freedom from causing engine dirtiness, free-flowing characteristics at ordinary temperatures, ease of handling, capability of rapid and simple blending with fuel, simplicity of preparation, inexpensiveness and utility as an intermediate to form, on reaction with formaldehyde, other antioxidant materials having still other useful properties.

An object of this invention is to provide a combination of alkylated phenol antioxidants which possess the foregoing beneficial attributes. A more particular object is to provide a liquid mixture of o-tert-butylated phenols having these beneficial attributes. Another particular object is to provide fuels, especially gasolines—clear or leaded—containing a small amount of these liquid mixtures of ortho butylated phenols. A further object is to very effectively stabilize gasoline and other organic material normally susceptible to deterioration in the presence of oxygen, air or ozone by incorporating therein a small amount of an outstandingly potent antioxidant mixture composed of ortho-tert-butylated phenols. A still further object is to provide such mixtures of ortho-tert-butylated phenols as intermediates for the preparation of other efficacious antioxidants. Other important objects of this invention will be apparent from the ensuing description.

The above and other objects of this invention are accomplished by providing, in combination, 60 to 80 weight percent of 2,6-di-tert-butylphenol, 3 to 15 weight percent of 2,4,6-tri-tert-butylphenol, and 30 to 5 weight percent of 2-tert-butylphenol. This combination has a large number of beneficial attributes which are not posesssed by any prior phenolic material.

In one embodiment of this invention a liquid mixture of phenols is provided having a notably high degree of antioxidant effectiveness. This mixture is, in combination, 65 to 80 weight percent of 2,6-di-tert-butylphenol, 10 to 15 weight percent of 2,4,6-tri-tert-butylphenol and 25 to 5 weight percent of 2-tert-butylphenol. The above combination provides outstanding antioxidant protection to various media, especially gasoline.

The combinations of this invention provide tremendous resistance to oxidative deterioration. The importance of this is clear when considering the large amount of research which has already been carried out in an effort to find effective antioxidants. This ability to prevent oxidative deterioration is especially manifested in gasoline.

To illustrate the outstanding antioxidant potency of the combinations of this invention, a series of gasoline storage tests was conducted. The gasoline was composed by volume of 12 percent olefins, 11 percent aromatics and 77 percent saturates and it contained 3.0 milliliters per gallon of tetraethyllead, 0.5 theory of bromide as ethylene dibromide and 1.0 theory of chlorine as ethylene dichloride. One large portion of this base gasoline was stored in the absence of an antioxidant. Another large portion was treated with a combination of this invention—72 percent by weight of 2,6-di-tert-butylphenol, 13 percent of 2,4,6-tri-tert-butylphenol and 15 percent of 2-tert-butylphenol—so that the fuel contained 0.001 percent by weight of the combination, and subjected to the storage test. The storage temperature in both cases was 110° F. Portions of the stored gasolines were removed periodically and subjected to ASTM Test Procedure D-381, a standard test for the determination of gum. The data so obtained are shown in Table I.

TABLE I.—EFFECT OF MIXED ORTH-TERTIARY-BUTYLATED PHENOLS ON OXIDATION STABILITY OF GASOLINE

| Antioxidant | ASTM Gum, mg./100 ml. | | | | | | |
|---|---|---|---|---|---|---|---|
| | Storage Period, Weeks | | | | | | |
| | Initial | 4 | 8 | 12 | 16 | 20 | 24 | 28 |
| Absent | 1 | 2 | 3 | 7 | 12 | 20 | 49 | |
| Present | 1 | 1 | 2 | 2 | 2 | 3 | | 7 |

Table I shows that there was 700 percent as much gum in the untreated fuel after storage for 24 weeks as there was in the fuel of this invention after storage for 28 weeks.

In addition to the above measurements, periodic determinations were made of the peroxide number—a well known index of oxidative deterioration—of the stored fuels. In all cases, it was found that the peroxide number of the fuel of this invention was far less than that of the untreated fuel stored for the same period of time.

For example, after 12 weeks of storage the peroxide number of the fuel of this invention was only about one-fifth of that of the untreated fuel.

The phenolic mixtures of this invention are compatible with the phosphorus additives so often used in gasoline and they can be blended with commercial antiknock fluids including those containing phosphorus. Further, in the gasolines of this invention very effective stabilization of not only the gasoline itself but of the organolead antiknock agent is achieved. Thus, in the above storage tests periodic determinations were made of the soluble alkyl lead salts which had formed. By so doing the extent by which the tetraethyllead had decomposed was directly measured. The withdrawn fuel samples were extracted with an ammonia-ammonium acetate solution to remove all of the ammonia-soluble lead salts which had formed. These salts were then quantitatively measured by conventional analytical procedures. The data are shown in Table II.

TABLE II.—EFFECT OF MIXED ORTHO-TERTIARY-BUTYLATED PHENOLS ON OXIDATION STABILITY OF TETRAETHYLLEAD

| Antioxidant | Soluble Alkyllead Salts, mg./100 ml. | | | | | | |
|---|---|---|---|---|---|---|---|
| | Storage Period, Weeks | | | | | | |
| | Initial | 4 | 8 | 12 | 16 | 20 | 24 |
| Absent | 0.6 | 1.3 | 2.6 | 3.2 | 4.8 | 5.4 | 7.0 |
| Present | 0.6 | 0.6 | 0.9 | 0.9 | 1.3 | 1.6 | 2.1 |

Table II shows that after extended periods of storage, over 300 percent as much soluble alkyllead salts were formed in the untreated fuel as compared with the fuel of this invention. Hence, the combination of this invention greatly increased the resistance of the tetraethyllead to oxidative deterioration.

As a further demonstration of the ability of the combinations of this invention to effectively stabilize alkyllead antiknock fluids, commercial antiknock mixes containing 61.5 weight percent tetraethyllead, 18.8 percent ethylene dichloride and 17.9 percent ethylene dibromide, with and without an additive combination of this invention were stirred for one week at 50° C. using an 80 volume percent outage of air. The precipitated sludge was measured as an indication of the decomposition of the tetraethyllead in the mix. Fluid containing no antioxidant had a precipitated sludge of 56 mg. per 50 ml. fluid, whereas fluid containing 0.1 and 0.3 weight percent, based on the tetraethyllead, of a combination of this invention both had a precipitated sludge of only 8 mg. per 50 ml. fluid. The samples were also analyzed to determine the quantity of soluble lead salts formed during storage. The fluid containing no antioxidant, after test, had 1.68 grams of soluble lead salts per 100 ml. tetraethyllead, whereas the fluids containing 0.1 and 0.3 weight percent, based on the tetraethyllead of a combination of this invention had soluble lead salts of 0.45 and 0.24 gram per 100 ml. of tetraethyllead respectively. These results demonstrate that combinations of this invention effectively stabilize organolead antiknock fluids and further that increasing the concentration of the antioxidant combination of this invention further retards the formation of soluble lead salts.

The gasolines of this invention are not deprived of their antioxidant content even when they are subjected to such very common process techniques as agitation in the presence of relatively large volumes of water, doctor sweetening, caustic washing, and the like. This advantage results from the fact that our combinations are insoluble in water and in dilute aqueous caustic solutions such as sodium hydroxide or potassium hydroxide solutions, even though they contain phenolic hydroxy groups and would usually be expected to react with and be transferred to the aqueous basic phase.

Our combinations are further characterized by a lack of toxicity, thus enabling them to be handled without expensive precautions.

Further, they are stable in storage and handling. Thus, they may be stored for use at a later time. This allows a refiner to stockpile the additives and take advantage of economic conditions.

There are no deleterious color formations associated with the use of our combinations. Thus, there is no deleterious effect on the common gasoline dyes used to characterize the various grades of gasoline.

Our combinations are also characterized by very high fuel solubility. This allows a refiner to use our material in a wide range of amounts to bring his fuel up to specification. To demonstrate the solubility characteristics of our combinations, samples of a combination of this invention were mixed with various solvents. Solvent was added in small increments from a buret to the mixture. These tests showed that the mixture was soluble in all proportions at 25° C. in ethanol, isooctane, n-heptane, toluene and methyl cyclohexane and was insoluble in 10 percent sodium hydroxide solution.

Because of its high solubility in toluene and other solvents, the antioxidant combinations of this invention can be blended with such solvents to provide a liquid mixture with an even lower freezing point. While the antioxidant combinations described herein are liquid at ordinary temperatures, a liquid mixture that can be used, as a liquid, at sub-ordinary temperatures can be obtained by dissolving the mixture in a suitable solvent. A particularly efficacious solvent is toluene and mixtures comprising 75 weight percent of an antioxidant mixture as described herein and 25 weight percent of toluene are particularly suitable for use as liquid antioxidants in sub-normal temperatures. Such a liquid mixture, where, for example, there is present in the antioxidant portion, 75 weight percent of 2,6-di-tert-butylphenol, 5 to 15 weight percent of 2-tert-butylphenol, and 10 to 15 weight percent of 2,4,6-tri-tert-butylphenol, has a freezing point of about 20° F.

Accordingly, in one embodiment of this invention there is provided a liquid antioxidant mixture comprising (a) about 75 weight percent of a composition comprising (1) about 75 weight percent of 2,6-di-tert-butylphenol, 5 to 15 weight percent of 2-tert-butylphenol and from 10 to 15 weight percent of 2,4,6-tri-tert-butylphenol; and (b) about 25 weight percent of toluene.

The combinations of this invention are free-flowing liquids at ordinary temperatures. The importance of this to the petroleum refiner is immediately apparent. The antioxidant mixtures of this invention can be rapidly, easily and homogeneously blended with refinery streams and products, such as gasoline, thereby permitting the elimination of auxiliary solvents, time consuming operations, and the like. Being liquid, our combinations are easily handled. They can be added to the gasoline by metering which is much more economical and convenient than blending weighed quantities of solid with a liquid.

Further, the fact that the combinations of this invention are liquid is completely unexpected. Our combinations can have as much as 80 percent 2,6-di-tert-butylphenol, which has a melting point of 38–39° C., and 15 percent of 2,4,6-tri-tert-butylphenol, which has a melting point of 130–131° C., and can still be a liquid at room temperatures (about 25° C.). Thus, in spite of the fact that as much as 95 percent of the material in our compositions can have a melting point much higher than room temperature, the antioxidant combination will still be liquid at room temperature.

The combinations of this invention have superior engine inductibility. Being liquid, and because of the unique synergistic properties of our combinations, they have no tendency to deposit out on the intake manifold of an engine. Solid additives tend to be left as a gummy deposit on the intake manifold when the gasoline is evaporated therefrom. For example, when 2,6-di-tert-butylphenol, the major component in our antioxidant mixture, is used without the other components of our mixture, deposits are found on the intake manifold. These deposits are greatly reduced when the other components of our mixture are added.

To illustrate the outstanding inductibility of the compositions of this invention as compared to each of the individual components, Socony Mobil Inductibility Tests were conducted. In these tests the total deposit in the induction system of an engine was measured with gasoline containing the mixed composition of this invention and with gasoline containing the individual alkyl phenol compounds of the compositions.

The Socony Mobil Inductibility Test is designed to evaluate induction system deposit forming tendencies of fuel and additive combinations. The test equipment consists of a carburetor air preheater, single cylinder engine carburetor and specially designed manifold and hot tube. The manifold and hot tube, built to Socony Mobile drawings, are designed to simulate inlet manifold and intake valve head temperature, respectively.

The entire unit is attached to a six-cylinder Plymouth engine which provides the vacuum necessary to draw the fuel-air mixture through the test parts. A special riser is employed to raise the Plymouth production carburetor from its normal position on the intake manifold. The test equipment is attached to the carburetor riser by means of a T. Individual heaters and controls permit temperature variation in the carburetor air preheater, manifold and hot tube. Fuel-air ratio is held in the limits of 0.074±0.002. Carburetor air is heated to 200° F. by means of a CRC air heater. The mixture leaving the manifold is controlled at 235° F. Hot tube temperature is held at 550° F.

Quantitative measurement of the deposit weights are obtained by washing the manifold interior with mixed solvents, equal parts of acetone, benzene, and methanol. This is evaporated to dryness and then washed with pentane to remove the pentane soluble material. The pentane insoluble deposits are considered the most significant.

Hot tube deposit is determined on an analytical balance from before and after test weighings.

The fuel used was an indolene fuel containing 3.0 ml. TEL/gal. The additives used were 2,6-di-tert-butylphenol, 2,4,6-tri-tert-butylphenol, 2-tert-butylphenol and a mixture of 75 percent 2,6-di-tert-butylphenol, 10 percent 2,4,6-tri-tert-butylphenol and 15 percent 2-tert-butylphenol at concentrations of 0.0005 weight percent. Other tests were conducted comparing 2,6-di-tert-butylphenol and the aforementioned mixture at concentrations of 1 weight percent. The results of these tests are tabulated.

TABLE III.—SOCONY MOBIL INDUCTIBILITY TEST

| Additive | Concentration (wgt. Percent) | Total Deposit Manifold Plus Hot Tube (mg.) | Expected Total Deposit (mg.) |
| --- | --- | --- | --- |
| 2,6-di-tert-butylphenol | 0.0005 | 206.5 | |
| 2,4,6-tri-tert-butylphenol | 0.0005 | 114.4 | |
| 2-tert-butylphenol | 0.0005 | 120.9 | |
| Mixture: 2,6-di-tert-butylphenol, 75 percent. 2,4,6-tri-tert-butylphenol, 10 percent. 2-tert-butylphenol, 15 percent. | 0.0005 | 149.1 | 184 |
| 2,6-di-tert-butylphenol | 1 | 328.8 | |
| Mixture: 2,6-di-tert-butylphenol, 75 percent. 2,4,6-tri-tert-butylphenol, 10 Percent. 2-tert-butylphenol, 15 percent. | 1 | 128.6 | [1] 247 |

[1] Based on 2,6-di-tert-butylphenol; therefore, this is a minimum figure

The above tests demonstrate that a concentration of 0.0005 and 1 weight percent the mixture of phenolic compounds leaves a deposit in the induction system of an engine that is substantially less than what would be expected from the deposit left by the individual alkylated phenols. At a concentration of 0.0005 weight percent, gasoline containing 2,6-di-tert-butylphenol left an intake manifold deposit of 206.5 mg. Gasoline containing the other components of the mixture of this invention left deposits of 114 and 120.9 mg. each. Since the mixture contains 75 percent of 2,6-di-tert-butylphenol and 10 and 15 percent, respectively, of the other components, the deposit that the mixture would be expected to leave is 184 mg. However, the deposit actually left was found to be only 149.1 mg., demonstrating a decrease in intake manifold deposit of 19 percent. Further, at 1 percent concentration, 2,6-di-tert-butylphenol left an intake manifold deposit of 328.8 mg. Since this compound constitutes 75 percent of the mixture, one would expect the deposit left by the mixture to be at least 247 mg. (not even taking into account the deposit that would be left by the other two components). The actual deposit found, however, was only 128.6 mg., which is at least 48 percent less than expected. Thus, it appears that the tremendous effectiveness of our combinations is the result of synergistic coaction among the components.

The results presented above are illustrative of the outstanding benefits achieved by the practice of this invention. Equally good results are achieved with other gasoline, both in the presence and absence of organolead antiknock agents.

In addition to superior engine inductibility, our combinations are characterized by freedom from engine "dirtiness" when used in gasoline. Many gasoline antioxidants which function satisfactorily in protecting the gasoline from oxidation in storage have the deleterious property of causing "dirtiness" in the engine when the gasoline is used. The combinations of this invention are free from such properties and do not adversely affect the cleanliness of the engine.

A preferred embodiment of this invention is achieved by providing, in combination, about 75 weight percent of 2,6-di-tert-butylphenol, 10 to 15 weight percent of 2,4,6-tri-tert-butylphenol and 15 to 5 weight percent of 2-tert-butylphenol. This preferred embodiment possesses all the foregoing important and eminently useful properties and is particularly effective as a liquid antioxidant in gasoline. It is also especially effective as an antioxidant for turbine oil.

To illustrate the beneficial and unexpected results obtained by this preferred embodiment, a Turbine Oil Oxidation Test is used. This test is a standard ASTM procedure (D-943-54) for measurement of the oxidation and inhibition effectiveness of antioxidants for transformer and turbine oils. The equipment used is a standard item manufactured by the Precision Scientific Company.

In this test a comparison was made between the oxidation and inhibition effectiveness of the three individual compounds, 2-tert-butylphenol, 2,6-di-tert-butylphenol, 2,4,6-tri-tert-butylphenol on the one hand, and a mixture of 75 weight percent of 2,6-di-tert-butylphenol, 12.5 weight percent of 2-tert-butylphenol and 12.5 weight percent of 2,4,6-tri-tert-butylphenol on the other. Twenty-five hundredths weight percent of each individual compound and the mixture were added separately to 300 ml. test samples of a conventional commercially available Mid-Continent crude, a non-additive oil. Oil samples containing these additives and a sample containing no additive were treated, according to the above test, by contacting them with oxygen for 3½ hours at 95° C. in the presence of 60 ml. of water, with coils of iron and copper wire present as oxidation catalysts. The test was then continued, with samples taken periodically, until the acid number of the oil exceeded two. The number of hours needed to reach this acid number was recorded. The results are shown in Table IV.

TABLE IV.—TURBINE OIL OXIDATION TEST

| Additive | Hours to Acid No. 2 | Improvement over the Base Oil, percent |
|---|---|---|
| None | 40 | |
| 2-tert-butylphenol | 193 | 382 |
| 2,6-di-tert-butylphenol | 148 | 270 |
| 2,4,6-tri-tert-butylphenol | 116 | 190 |
| 75 percent of 2,6-di-tert-butylphenol<br>12.5 percent of 2-tert-butylphenol<br>12.5 percent of 2,4,6-tri-tert-butylphenol | 184 | 360 |

An analysis of this data reveals that the additive mixture of this invention affords a completely unexpected degree of antioxidant protection. This can be seen by noting that the percentage improvement over the base oil for the additive mixture is 360 percent whereas one skilled in the art and knowing the data for the component parts of applicants' additive mixture would expect the improvement over the base oil to be only 27 percent. This can be seen from the fact that 2,6-di-tert-butylphenol, while giving a 270 percent improvement of the test oil, comprises only 75 weight percent of our additive mixture; thus giving an unexpected effective improvement of only 202.5 percent. Likewise while 2,4,6-tri-tert-butylphenol gives a 190 percent improvement over the base oil, this compound comprises only 12.5 percent of our additive mixture and thus would give an expected effective improvement of only 23.75 percent. Further the only compound which is similar to our additive mixture in its ability to improve the oxidation stability of the test oil comprises only 12.5 percent of our additive mixture. This compound, 2-tert-butylphenol, gives an improvement over the base oil of 382 percent. Its presence as 12.5 percent of our mixture would be expected to give an effective improvement of only 46.75 percent. Thus, it can be seen that 87½ percent of our mixture consists of compounds which, combined, improve the oxidation stability of a base oil by only 226 percent, well below the improvement effected by our additive mixture. The presence in our mixture of only 12.5 percent of 2-tert-butylphenol having approximately the same antioxidant effectiveness as the total mixture would not be expected to yield a product with such high antioxidant effectiveness as our additive mixture. Hence, as can be seen from this test, the protection afforded by our additive mixture is completely unobvious and unexpected.

Antioxidant mixtures of this invention have been approved for use in all types of military fuels. For motor gasolines, the use of the mixed antioxidants of this invention is based on its content of 2,6-di-tert-butylphenol which is included in the list of approved antioxidants in Specification MIL–G–3056B. For aviation gasolines, the mixture of phenols is included in Specification MIL–G–5572C. For jet and rocket fuels, the mixture of this invention is considered as a suitable form of 2,6-di-tert-butylphenol which is included in the list of approved antioxidants in Specifications MIL–J–5624D, MIL–F–25656 (U.S.A.F.), MIL–F–25576B (U.S.A.F.), MIL–F–25558B (U.S.A.F.), MIL–F–25524 and MIL–J–5161E.

It is well known that military approval of an antioxidant for use in fuel, and especially aviation gasoline, jet fuel and rocket fuel, is extremely difficult to obtain. The antioxidant must pass numerous rigid and severe tests before it is accepted. Not only must the material be an outstanding antioxidant, but lack of any of the other properties heretofore described would disqualify it.

As noted, a distinct advantage of this mixture is its ability to react with formaldehyde under basic conditions to yield antioxidant compositions which have highly beneficial properties. While the mixtures of phenolic compounds described find utility as antioxidants for many media, they are particularly efficacious as gasoline antioxidants. On the other hand, the products resulting from reacting these phenolic mixtures with formaldehyde, in the presence of a base, find particular utility as antioxidants for lubricating oils and also possess the surprising property of being soluble up to 50 weight percent in lubricating oil. In contrast, the condensation product of 2,6-di-tert-butylphenol, for example, with formaldehyde has a solubility limit in lubricating oil of about 5 percent. Thus, not only can the phenolic mixtures of this invention be used as antioxidants in gasoline, but can also be used as intermediates in the preparation of other efficacious antioxidants which can be used effectively as part of a lube oil concentrate, for example, because of their high oil solubility.

The following example illustrates the use of the mixtures of this invention as intermediates in the preparation of other beneficial antioxidant material.

*Example I*

A mixture of 75 percent of 2,6-di-tert-butylphenol and 15 percent ortho-tertiary butylphenol containing 10 percent of 2,4,6-tri-tert-butylphenol was reacted with paraformaldehyde in the presence of ethanol. The following amounts of reactants were employed:

724 parts of phenol mixture
20 parts of potassium hydroxide
76 parts of paraformaldehyde
600 parts of 95 percent ethanol The reaction was conducted at reflux (81–83° C.) for two hours after which time the mixture was cooled to 70° C. and neutralized with glacial acetic acid. The alcohol was stripped under vacuum beginning at 70° C. and ending at 35° C. and 10 mm. pressure. The residue was then dried with 1400 parts of benzene and washed three times in 750-part aliquots of water, dried and the benzene was removed by vacuum distillation. The reaction product, a viscous oil, was found to be soluble and miscible with a hydrocarbon lubricating oil at up to 50 percent weight concentration.

To demonstrate the efficacious results obtained by using this reaction product in a lubricating oil, an engine test was used to measure the reduced engine wear characteristics and greatly improved oxidation stability of the oil as well as greatly reduced bearing corrosion properties. The test was conducted with a single cylinder CLR oil test engine using CRC test designation L–38 with certain minor modifications. The L–38 test is completely described in a paper presented by E. A. Martin at the 1961 SAE summer meeting entitled "Development of Research Technique for Study of Oxidation Characteristics of Crankcase Oils in CLR Oil Test Engine." The tests were conducted on straight mineral oil containing no additives which had an SAE viscosity of 20. In addition to a test on the mineral oil without additives a test was conducted using onehalf weight percent of the product of Example I.

The test technique involves the continuous operation of the single cylinder CLR oil test engine under constant speed, air-fuel ratio and fuel-flow conditions for a total of at least 40 hours, subsequent to a break-in period of 4½ hours. Prior to each test run, the engine is thoroughly cleaned, measurements of certain engine parts are taken and a new set of piston rings and new copper lead connecting rod test bearing inserts are installed. Performance of the test oil is judged by a visual examination of the engine for deposits, by the weight loss of the copper lead test bearing and by a comparison of the inspection data on samples of used oil taken at periodic intervals with the inspection data on the new oil. These inspection data consist of the viscosity at 100° F., the acid number and a visual rating of the oil.

For the following tests certain modifications were made in the L–38 test procedure as outlined in the publication described above. The oil sump was operated at 280°

F. and a constant engine speed of 3075 r.p.m. was employed. A bronze camshaft thrust washer was employed instead of the aluminum washer called for. The fuel employed in the test was a mixture of 60 percent alkylate and 40 percent of a commercially available base stock with 3 ml. of tetra-ethyllead per gallon as 62 mix. The "off gas"—that is, the total of blowby and air bled into the crankcase—was not measured. The results of these tests show that the base oil is greatly improved by the addition thereto of one-half weight percent of the product of Example I. This is shown by the data in Table V summarizing the test results.

TABLE V.—L-38 TEST RESULTS

| Additive | Concentration, wt. percent | Bearing Wt. Loss (mg.) | Oil After 40 Test Hours | |
|---|---|---|---|---|
| | | | Acid No. | Viscosity Increase, Percent |
| None | | 1,828 | 3.1 | 10.9 |
| Product of Example I | 0.5 | 139 | 2.0 | 6.4 |

The results of these tests as shown in Table V indicate a much more highly stable oil and vastly reduced bearing weight loss.

In another preferred embodiment of this invention, there is provided, in combination, from 60 to 70 weight percent of 2,6-di-tert-butylphenol, from 3 to 11 weight percent of 2,4,6-tri-tert-butylphenol and from 15 to 30 weight percent of 2-tert-butylphenol. The combinations of this embodiment form very effective and highly soluble antioxidant material when reacted with formaldehyde.

In a still further preferred embodiment of this invention a mixture of phenols is provided which comprises, in combination, from 62 to 68 weight percent of 2,6-di-tert-butylphenol, from 5 to 9 weight percent of 2,4,6-tri-tert-butylphenol and from 19 to 25 weight percent of 2-tert-butylphenol. This combination has been found to be particularly suitable for use as an intermediate, by reaction with formaldehyde, as it results in the preparation of other antioxidant material having low cost, a particularly high degree of solubility in lubricating oil, a particularly high freedom from crystallinity and a particularly high degree of effectiveness.

In the above embodiment, the weight ratio of 2,6-di-tert-butylphenol to 2-tert-butylphenol is between 2.4/1 and 3.6/1. Using combinations containing a substantially higher ratio results in products which may form a haze on standing and which require stirring before use. Also, the solubility and fluidity is decreased. Using combinations with a substantially lower ratio results in products which are also less soluble and less fluid and which have a decreased effectiveness.

Another important advantage of using the last preferred combination is that it is easier and more economical to prepare than other combinations previously described in that less isobutylene is required. Thus, in the preparation of a phenolic mixture containing 75 weight percent 2,6-di-tert-butylphenol, 10 to 15 weight percent of 2,4,6-tri-tert-butylphenol and 15 to 5 weight percent of 2-tert-butylphenol optimum reaction conditions exist when 2.06 moles of isobutylene per mole of phenol are reacted in the presence of aluminum phenoxide. For the above preferred embodiment in which a phenolic mixture containing 62 to 68 weight percent of 2,6-di-tert-butylphenol, from 5 to 9 weight percent of 2,4,6-tri-tert-butylphenol and from 19 to 25 weight percent of 2-tert-butylphenol optimum reaction conditions exist when 1.74 moles of isobutylene are reacted per mole of phenol with an aluminum phenoxide catalyst. Thus, not only does this latter preferred embodiment of phenols possess the unique ability of reacting as an intermediate to form highly soluble antioxidant products, but they are also more economically and easily produced than other mixtures of this invention.

Another advantage of the compositions of this invention is their low cost and ease of preparation. As noted, they are prepared as a mixture by reacting phenol with isobutylene in the presence of an aluminum phenoxide catalyst. The following specific example illustrates a preferred method by which a preferred combination of this invention is prepared. All parts and percentages are by weight.

*Example II*

An autoclave is charged with 376.4 parts of anhydrous phenol, 87 parts of dry toluene, and 3.6 parts of aluminum turnings. The vessel is sealed and heated with agitation. At a temperature between 120 and 200° C., a sharp pressure rise of 60 to 100 p.s.i. accompanied by a heat kick of 15 to 20° C. indicates the formation of aluminum phenoxide with the evolution of hydrogen. When no further pressure increase is observed, the reaction mass is cooled, the autoclave vented, and the system flushed with nitrogen.

The autoclave is again sealed and heated to 100° C. At this temperature 425 parts of liquid isobutylene is fed to the system as rapidly as possible, with sufficient cooling available to control the initial exothermic reaction. After the olefin feed is completed, the agitated mixture is cooked at 100° C. to complete the reaction. Total reaction time is about seven hours. The autoclave is then cooled, vented and the reaction product discharged. To this reaction mixture is then added 173 parts of toluene. Hydrolysis of the catalyst is accomplished by agitating this organic phase with a solution of 60 parts of concentrated hydrochloric acid in 200 parts of water. The two-phase system is filtered, the aqueous layer discarded and the clear organic solution washed with two 200-part portions of water. After azeotropic drying, the organic phase is subjected to distillation at 30 millimeters of mercury pressure until a temperature of 110° C. is reached. The forecut which comprises toluene and phenol is thereby removed from the reaction product and discarded. The residue is a preferred combination of this invention being composed of 75 percent of 2,6-di-tert-butylphenol, 13 percent of 2,4,6-tri-tert-butylphenol, and 12 percent of 2-tert-butylphenol.

The physical properties of this combination are as follows:

Form _____ Liquid.
Color _____ Amber.
Density at 20° C. _____ 0.941.
Freezing point _____ 18° C.
  Supercools to 7–10° C.
Freezing point of mixture:
  In 25 percent toluene —12° C.
  In 25 percent kerosene —6° C.

To prepare those combinations of this invention containing lower proportions of 2,4,6-tri-tert-butylphenol and higher proportions of 2-tert-butylphenol as compared with the proportions shown in the above example, the reaction between isobutylene and phenol is carried out at temperatures of about 85° C. to 95° C. and less isobutylene is added. On the other hand, to prepare combinations of this invention containing higher proportions of 2,4,6-tri-tert-butylphenol and lower proportions of 2-tert-butylphenol, the reaction temperatures are in the range of about 105° C. to about 115° C. and more isobutylene is added. Minor adjustments in the fractionation procedure are also of help.

It is emphasized that the combinations of this invention cannot be prepared by using any other phenol alkylation process known in the art. For example, when phenol and isobutylene are reacted in the presence of sulfuric acid (or other condensing agents, such as phosphoric acid, anhydrous aluminum chloride, boron trifluoride, ferric chloride, hydrogen chloride, etc.), paraalkylation is so predominant that the reaction mixture comprises largely para-tert-butylphenol, 2,4-di-tert-butylphenol and 2,4,6-tri-tert-butylphenol. In fact, 2,6-di-tert-butylphenol cannot be prepared in this manner. Thus, these prior processes using sulfuric acid and like catalysts provide reaction mixtures which not only are entirely different from those prepared according to the process set forth in our above-referred-to patent, but which are solid at ordinary temperatures. This is obvious by noting that para-tert-butylphenol melts at 99° C., 2,4-di-tert-butylphenol at 57° C. and 2,4,6-tri-tert-butylphenol at 130° C.

The combinations of this invention can also be formed by mixing together in appropriate proportions pure 2,6,-di-tert-butylphenol, 2,4,6-tri-tert-butylphenol and 2-tert-butylphenol prepared by other methods. However, this procedure is less desirable because a multiplicity of different chemical processes and product separations are required in order to procure each of the individual components in its pure state. Consequently, such procedures are more difficult, time-consuming and expensive.

Additional quantities of a particular component of the mixture may be added to the "ortho-alkylation" mixture produced as described above to bring the relative proportions to a desired level. On the other hand, this can often be accomplished by a change in the reaction variables as described above. Economics would dictate which method should be used.

By using the techniques described above, especially those in connection with Example II, there are prepared the anti-oxidant combinations of this invention, such as those of the following illustrative examples in which all percentages are by weight.

*Example III*

The combination of 75 percent of 2,6-di-tert-butylphenol, 13 percent of 2,4,6-tri-tert-butylphenol and 12 percent of 2-tert-butylphenol is a liquid at 18° C. and is insoluble in water and in dilute aqueous caustic solutions.

*Example IV*

The mixture of 75 percent of 2,6-di-tert-butylphenol, 10 percent of 2,4,6-tri-tert-butylphenol and 15 percent of 2-tert-butylphenol is a liquid at 20° C. and is insoluble in water and dilute aqueous caustic solutions.

*Example V*

The combination of 75 percent of 2,6-di-tert-butylphenol, 15 percent of 2,4,6-tri-tert-butylphenol and 10 percent of 2-tert-butylphenol is a liquid at 25° C. It is insoluble in water and dilute aqueous caustic solutions.

*Example VI*

The combination of 72 percent of 2,6-di-tert-butylphenol, 13 percent of 2,4,6-tri-tert-butylphenol and 15 percent of 2-tert-butylphenol freezes at 21° C. and is insoluble in water and in dilute aqueous caustic solutions.

*Example VII*

The mixture of 69 percent of 2,6-di-tert-butylphenol, 15 percent of 2,4,6-tri-tert-butylphenol and 16 percent of 2-tert-butylphenol freezes at 19° C. and is insoluble in water and in dilute aqueous caustic solutions.

*Example VIII*

The combination of 65 percent of 2,6-di-tert-butylphenol, 10 percent of 2,4,6-tri-tert-butylphenol and 25 percent of 2-tert-butylphenol is a liquid at 20° C. It is insoluble in water and in dilute aqueous caustic solutions.

*Example IX*

The mixture of 80 percent of 2,6-di-tert-butylphenol, 15 percent of 2,4,6-tri-tert-butylphenol, and 5 percent of 2-tert-butylphenol is a liquid at 25° C. It is insoluble in water and in dilute aqueous caustic solutions.

*Example X*

The 93 percent pure mixture of phenolic compounds containing 60 percent of 2,6-di-tert-butylphenol, 3 percent of 2,4,6-tri-tert-butylphenol and 30 percent of 2-tert-butylphenol is a liquid at 20° C. It is insoluble in water and in dilute aqueous caustic solutions and reacts with formaldehyde to yield a highly soluble and effective antioxidant material.

*Example XI*

The 96 percent pure mixture of phenolic compounds containing 68 percent of 2,6-di-tert-butylphenol, 9 percent of 2,4,6-tri-tert-butylphenol and 19 percent of 2-tert-butylphenol is a liquid at 15° C. It is insoluble in water and in dilute aqueous caustic solutions and upon reaction with formaldehyde in isopropanol, under basic conditions, produces a highly effective antioxidant material that is soluble in oil up to 50 weight percent.

*Example XII*

The 92 percent pure mixture of phenolic compounds containing 62 percent of 2,6-di-tert-butylphenol, 5 percent of 2,4,6-tri-tert-butylphenol and 25 percent of 2-tert-butylphenol is a liquid at 10° C. It is insoluble in water and in dilute aqueous caustic solutions and, upon reaction with formaldehyde under basic conditions, produces a highly effective antioxidant material that is soluble in oil up to 50 weight percent.

*Example XIII*

The 96 percent pure mixture of phenolic compounds containing 70 percent of 2,6-di-tert-butylphenol, 11 percent of 2,4,6-tri-tert-butylphenol and 15 percent of 2-tert-butylphenol is a liquid at normal temperatures. It is insoluble in water and in dilute aqueous caustic solutions and upon reaction with formaldehyde, under basic conditions, produces a highly effective, highly oil soluble antioxidant material.

Another embodiment of this invention is gasolines containing the above-described specific combinations of ortho-tert-butylated phenolic compounds. In this embodiment, the use of small amounts of the above combinations—from about 0.0005 to about 1 percent by weight—provides many important advantages. For example, these gasoline compositions are easily prepared because of the high gasoline solubility of our combinations and the great speed with which they are homogeneously dissolved in the gasoline. Furthermore, because our combinations are liquids at ambient temperatures, the need for an auxiliary solvent, which is required when employing many effective antioxidants known heretofore, is eliminated. Moreover, once prepared, the gasolines of this invention can be subjected to extremely low temperatures without encountering separation of the antioxidant content.

As noted above, a particularly advantageous mixture of phenols useful in inhibiting gasoline is that which contains, in combination, 65 to 80 weight percent of 2,6-di-tert-butylphenol, 10 to 15 weight percent of 2,4,6-tri-tert-butylphenol and 25 to 5 weight percent of 2-tert-butylphenol. Within these preferred mixtures the combination of 75 weight percent of 2,6-di-tert-butylphenol, 10 to 15 weight percent of 2,4,6-tri-tert-butylphenol and 15 to 5 weight percent of 2-tert-butylphenol is most preferred since it provides the highest degree of stabilization to gasoline.

In formulating the finished gasolines of this invention, an appropriate amount of one or more of our combinations is blended with gasoline or gasoline fractions. If the gasoline is to be leaded, the combinations of this invention can be blended with the base gasoline prior to, during, or after the addition of the organo-lead antiknock agent. The combinations can also be pre-blended with the antiknock agent and the composite mixture added directly to the fuel. In any of these procedures, a slight amount of physical agitation, such as stirring, shaking, etc., causes the rapid formation of homogeneous and stable solutions.

As noted previously, although completely unnecessary at ordinary temperatures, an auxiliary solvent can be used in conjunction with our combinations. Some refiners find it advantageous to prepare concentrated solutions of the gasoline antioxidants which are then fed into the fuel by means of preadjusted metering systems, such as proportioning pumps. A particular advantage of our combinations is that the gasoline itself can be used to prepare these concentrates thereby avoiding the introduction of extraneous material to the fuel which might conflict with product specifications. Also the convenience of using the gasoline rather than a different type of chemical solvent and the inexpensiveness of so doing are other particular advantages.

The following examples illustrate various gasolines of this invention. All percentages are by weight unless otherwise indicated.

*Example XIV*

To a gasoline composed by volume of 35 percent of straight-run components, 40 percent of catalytically-cracked stocks, 10 percent of polymer blending stock and 15 percent of butane and pentane (initial boiling point—IBP 101° F., 10 percent 139° F., 50 percent 224° F., 90 percent 328° F., endpoint—EP 389° F.) is added 0.0005 percent of a mixture of 75 percent of 2,6-di-tert-butylphenol, 13 percent of 2,4,6-tri-tert-butylphenol and 12 percent of 2-tert-butylphenol. The resultant gasoline possesses unusually great resistance to oxidative deterioration.

*Example XV*

With gasoline composed by volume of 83 percent of straight-run components, 10 percent of catalytically-cracked stocks and 5 percent of butane and pentane (IBP 106 F., 10 percent 148° F., 50 percent 207° F., 90 percent 260° F., EP 370° F.) is blended 1 percent of a mixture of 75 percent of 2,6-di-tert-butylphenol, 10 percent of 2,4,6-tri-tert-butylphenol and 15 percent of 2-tert-butylphenol. The resultant gasoline possesses outstanding resistance to oxidative deterioration.

*Example XVI*

To a gasoline composed by volume of 23 percent of straight-run components, 21 percent of catalytically cracked stocks, 41 percent of thermally cracked stocks, and 15 percent of gasoline reformate (IBP 94° F., 10 percent 122° F., 50 percent 210° F., 90 percent 318° F., EP 387° F.) is added 0.1 percent of a mixture of 75 percent of 2,6-di-tert-butylphenol, 15 percent of 2,4,6-tri-tert-butylphenol and 10 percent of 2-tert-butylphenol. After mixing, the finished gasoline possesses vastly improved resistance to oxidative deterioration.

*Example XVII*

With a stable gasoline composed of 100 percent of straight-run hydrocarbons (IBP 116° F., 10 percent 150° F., 50 percent 184° F., 90 percent 239° F., EP 300° F.) containing 2.6 milliliters per gallon of tetraethyllead, 0.5 theory of bromine as ethylene dibromide and 1.0 theory of chlorine as ethylene dichloride is blended 0.05 percent of a mixture of 75 percent of 2,6-di-tert-butylphenol, 12 percent of 2,4,6-tri-tert-butylphenol and 13 percent of 2-tert-butylphenol. The tetraethyllead of this gasoline is not adversely affected by atmospheric oxidation, even after storage for long periods of time.

*Example XVIII*

To a gasoline composed by volume of 92 percent of catalytically-cracked components, 6 percent of thermally cracked stocks, and 2 percent of gasoline reformate (IBP 93 F., 10 percent 126° F., 50 percent 223° F., 90 percent 358° F., EP 416° F.) is added 0.2 percent of a mixture of 73 percent of 2,6-di-tert-butylphenol, 12 percent of 2,4,6-tri-tert-butylphenol and 15 percent of 2-tert-butylphenol. After mixing, the gasoline possesses greatly increased resistance against oxidative deterioration.

*Example XIX*

With a gasoline composed by volume of 53 percent of straight-run hydrocarbons and 47 percent of catalytically-cracked stocks (IBP 100° F., 10 percent 137° F., 50 percent 207° F., 90 percent 312° F., EP 378° F.) containing 3.0 grams per gallon of lead as tetraoctyllead, 0.6 theory of bromine as mixed dibromotoluenes, 0.8 theory of chlorine as 1,2,4-trichlorobenzene and 0.2 theory of phosphorus as tri-(β-chloropropyl) thionophosphate is blended 0.5 percent of a mixture composed of 80 percent of 2,6-di-tert-butylphenol, 15 percent of 2,4,6-tri-tert-butylphenol and 5 percent of 2-tert-butylphenol. After mixing, the resultant gasoline and its organolead constituent possess greatly increased resistance against oxidative deterioration.

*Example XX*

To gasoline composed by volume of 55 percent of straight run components, 30 percent of catalytically-cracked stocks and 13 percent of butane and pentane is blended 0.75 percent of a 93 percent pure mixture of phenolic compounds containing 60 percent of 2,6-di-tert-butylphenol, 3 percent of 2,4,6-tri-tert-butylphenol and 30 percent of 2-tert-butylphenol. The resultant gasoline possesses outstanding resistance to oxidative deterioration.

*Example XXI*

With a stable gasoline composed of 100 percent of straight run hydrocarbons (IBP 116° F., 10 percent 150° F., 50 percent 184° F., 90 percent 239° F., EP 300° F.) containing 3.0 mg. per gallon of tetraethyllead, 0.6 theory of bromine as ethylene dibromide and 1.2 theory of chlorine as ethylene dichloride is blended 0.1 percent of a 96 percent pure mixture of phenolic compounds containing 68 percent of 2,6-di-tert-butylphenol, 9 percent of 2,4,6-tri-tert-butylphenol and 19 percent of 2-tert-butylphenol. The tetraethyllead of this gasoline is not adversely affected by atmospheric oxidation even after storage of long periods of time and when used in an engine the amount of deposit on the intake manifold is less than that occurring with similar gasolines containing only 2,6-di-tert-butylphenol as an antioxidant.

*Example XXII*

With a gasoline composed by volume of 50 percent of straight run hydrocarbons and 50 percent of catalytically-cracked stocks containing 1.8 grams per gallon of lead as tetraethyllead, 0.3 theory of bromine as ethylene dibromide and 0.6 theory of chlorine as ethylene dichloride is blended 0.001 percent of a 92 percent pure mixture of phenolic compounds containing 62 percent of 2,6-di-tert-butylphenol, 5 percent of 2,4,6-tri-tert-butylphenol and 25 percent of 2-tert-butylphenol. After mixing, the resultant gasoline and its tetraethyllead constituent possesses greatly increased resistance against oxidative deterioration.

*Example XXIII*

To a gasoline similar to that of Example XXI is added 0.2 percent of a mixture of phenolic compounds containing 65 percent of 2,6-di-tert-butylphenol, 10 percent of 2,4,6-tri-tert-butylphenol and 25 percent of 2-tert-butylphenol. The resultant gasoline and its tetraethyllead constituent possess increased resistance against oxidative deterioration.

*Example XXIV*

To a gasoline similar to that of Example XX is blended 0.1 percent of a 96 percent pure mixture of phenolic compounds containing 70 percent of 2,6-di-tert-butylphenol, 11 percent of 2,4,6-tri-tert-butylphenol and 15 percent of 2-tert-butylphenol. The resultant gasoline is resistant to oxidative deterioration.

In the unleaded fuel embodiments of this invention, other well known additives can be employed. Included among these are metal deactivators, such as N,N-disalicylidene-1,2-amino-propane, etc.; other antiknock agents, such as the carbonyls of iron, nickel, and like elements, aromatic amine antiknock agents, such as N-methyl aniline, xylidine, etc.; anti-icing and anti-rust additives; and the like.

In the leaded fuel embodiments of this invention, use can be made of a wide variety of organolead antiknock agents known in the art. Illustrative of these are tetramethyllead, tetraethyllead, tetrapropyllead, tetraisopropyllead, tetrabutyllead, tetraamyllead, tetraoctyllead, tetraphenyllead, tetratolyllead, diethyldiphenyllead, methyltriethyllead, dimethyldiethyllead, trimethylethyllead, and the like. Generally speaking, these organolead antiknock agents are used at concentrations within the range of about 0.05 to 6.5 grams of lead per gallon. Similarly, use can be made of a wide variety of organic halide scavengers for the lead compounds. Representative scavengers are ethylene dibromide, ethylene dichloride, carbon tetrachloride, propylene dibromide, 1,2,2-tribromopropane, hexachloropropylene, mixed bromoxylenes, 1,4-dibromobutane, 1,4-dichloropentane, $\beta,\beta'$-dibromodiisopropyl ether, $\beta,\beta'$-dichlorodiethyl ether, trichlorobenzene, dibromotoluene, tert-butyl bromide, 2-methyl-2-bromobutane, 2,5-dimethyl-2,5-dibromohexane, 2,5-dichlorohexane, 1-phenyl-1-bromoethane, ethyl-$\alpha$-bromoacetate, 1,1-dichloro-1-nitroethane, 1-bromo-3-hydroxypropane, and, in general, such scavengers (and organolead antiknock agents) as disclosed in U.S. Patents 1,592,954; 1,668,022; 2,364,921; 2,479,900; 2,479,901; 2,479,902; 2,479,903 and 2,496,983.

Particularly preferred scavengers are halohydrocarbons having a vapor pressure from 0.1 to 250 millimeters of mercury at 50° C. Preferably the total amount of scavenger is from about 0.5 to about 2 theories, although when using mixtures of bromine-containing and chlorine-containing scavengers, particularly bromo and chloro-hydrocarbons, a wider range of concentrations in the proportions described in U.S. 2,398,281 can be successfully used.

Other additives which can be present in the leaded fuels of this invention are phosphorus compounds, such as tri-($\beta$-chloropropyl) thionophosphate, dimethylphenyl phosphate, dimethyltolyl phosphate, dimethylxylyl phosphate, dixylyl phosphoramidate, trimethyl phosphate, tricresyl phosphate, trialkylphosphines, and the like. Also, other additives can be used, such as those described above in connection with the unleaded fuel embodiments of this invention.

An advantage of this invention is the fact that the herein described ortho-tert-butylated phenolic combinations are highly compatible with all such supplemental additives.

The combinations of this invention are highly useful as stabilizers for other oxygen-sensitive materials. For example, when used in small concentrations—0.005 to about 1 percent by weight—in diesel fuel there results a marked reduction in the formation of sludge and sediment. This, in turn, reduces the clogging of fuel injectors, and the like. When used in concentrations of up to about 2 percent by weight in mineral oils, enhanced resistance to oxidative deterioration results. Thus, in crankcase lubricating oils, the combinations of this invention prevent piston ring plugging, reduce the amount of sludge and varnish formation, maintain a lower acidity in the oil, and reduce the extent by which the viscosity of the oil is changed during use. Similarly, when employed at concentrations from about 0.005 to about 2 percent by weight in lubricating greases, the combinations of this invention reduce the oxygen uptake of the grease and thereby prevent premature breakdown of the grease structure which normally occurs upon oxidation of the metallic soap thickening agent.

Small concentrations—about 0.005 to about 2 percent by weight—of our combinations in petroleum wax (e.g., paraffin wax, microcrystalline wax, etc.) greatly reduce the normal tendency of oxidation and polymerization reactions involving traces of impurities in the wax and normally catalyzed by the action of ultraviolet light and traces of metallic impurities. Thus, the petroleum waxes can be readily used on paper coatings for food containers and food wrappings without the danger of premature rancidity and undesirable taste. The same concentrations of our combinations in rubber and other polymers, such as synthetic rubber, polyethylene, polypropylene, etc., greatly reduces the extent by which these materials are deteriorated by contact with air, oxygen or ozone. Thus, premature discoloration, embrittlement, cracking, chain scission, and other undesirable effects of premature oxidation are eliminated or at least greatly reduced by using the combinations of this invention. The combinations of this invention may also be employed in edible fats and oils at concentrations of up to about 0.5 percent by weight. In these media, our combinations prevent the premature development of rancidity and all of its undesirable ramifications.

We claim:

1. A liquid composition comprising from 60 to 80 weight percent of 2,6-di-tert-butylphenol, from 5 to 30 weight percent of 2-tert-butylphenol and from 3 to 15 weight percent of 2,4,6-tri-tert-butylphenol.

2. A liquid composition consisting essentially of 65 to 80 weight percent of 2,6-di-tert-butylphenol, 10 to 15 weight percent of 2,4,6-tri-tert-butylphenol, and 25 to 5 weight percent of 2-tert-butylphenol.

3. A liquid composition consisting essentially of about 75 weight percent of 2,6-di-tert-butylphenol, 10 to 15 weight percent of 2,4,6-tri-tert-butylphenol, and 15 to 10 weight percent of 2-tert-butylphenol.

4. A liquid antioxidant mixture comprising about 75 weight percent of the composition of claim 3 and about 25 weight percent of toluene.

5. A liquid composition comprising from 60 to 70 weight percent of 2,6-di-tert-butylphenol, from 15 to 30 weight percent of 2-tert-butylphenol and from 3 to 11 weight percent of 2,4,6-tri-tert-butylphenol.

6. A liquid composition comprising from 62 to 68 weight percent of 2,6-di-tert-butylphenol, from 19 to 25 weight percent of 2-tert-butylphenol and from 5 to 9 weight percent of 2,4,6-tri-tert-butylphenol.

7. A liquid composition of tertiary butylated phenols comprising 2,6-di-tert-butylphenol and 2-tert-butylphenol wherein the weight ratio of said 2,6-di-tert-butylphenol to said 2-tert-butylphenol is from about 2.4/1 to about 3.6/1.

8. A liquid composition of tertiary butylated phenols comprising 2,6-di-tert-butylphenol, 2,4,6-tri-tert-butylphenol and 2-tert-butylphenol wherein the weight ratio of said 2,6-di-tert-butylphenol to said 2-tert-butylphenol is from about 2.4/1 to about 3.6/1.

References Cited in the file of this patent

UNITED STATES PATENTS

| | | |
|---|---|---|
| 2,202,877 | Stevens et al. | June 4, 1940 |
| 2,361,337 | Walters | Oct. 24, 1944 |
| 2,410,829 | Luten | Nov. 12, 1946 |
| 2,459,597 | Stillson et al. | Jan. 18, 1949 |
| 2,831,898 | Ecke et al. | Apr. 22, 1958 |
| 2,980,519 | Nixon et al. | Apr. 18, 1961 |
| 3,032,595 | Neuworth et al. | May 1, 1962 |
| 3,051,762 | Stroh et al. | Aug. 28, 1962 |

FOREIGN PATENTS

| | | |
|---|---|---|
| 589,588 | Great Britain | June 24, 1947 |

OTHER REFERENCES

Industrial and Engineering Chemistry, vol. 42, No. 1, January 1950, "Alkyl Phenols as Antioxidants," Rosenwald et al., pp. 162–165.